Patented June 13, 1933

1,913,960

UNITED STATES PATENT OFFICE

EDWARD E. ROLL, OF CLEVELAND, OHIO, ASSIGNOR OF ONE-HALF TO HERMAN SCHMITT, OF CLEVELAND, OHIO

PROCESS OF PRODUCING A COMPOSITION FOR DECOLORIZING AND PURIFYING OILS

No Drawing.   Application filed February 20, 1929.   Serial No. 341,566.

This invention relates to a process of producing a composition for decolorizing and purifying oils.

In the extraction of aluminum from various aluminum bearing clays by the ordinary method of treatment with sulphuric acid, the clay residue which has heretofore been discarded as valueless and which has accumulated in such large amounts that its disposition has become a problem still contains as high as 14% of alumina. This residue which I will term the sulphate of alumina residue varies somewhat in composition depending on the source of the clay and the particular process used in its extraction.

The composition of the residue which remains after the extraction of certain Missouri clays is found upon analysis to be approximately as follows:

| | |
|---|---|
| Silica | 67.15% |
| Alumina | 14.30 |
| Titanium oxide | 3.43 |
| Iron oxide | .69 |
| Lime | .35 |
| Magnesia | .20 |
| Alkalies | .11 |
| Loss on ignition | 13.68 |

This residue as it exists is found to have no value as a decolorizer for oils.

It is the object of my invention to produce a valuable product from this heretofore discarded residue and by treating it as hereinafter described produce a substance which may be used for the decolorizing and purification of oils.

In the extraction of the aluminum which results in the particular residue, the analysis of which is given above, the clay is first baked and then treated with sulphuric acid, the liquid separated, and the solid material washed with a limited amount of water. The aluminum is precipitated from the acid solution. The solid material is discharged.

This solid material which I term the sulphate of alumina residue is quite acid in reaction and as above set forth contains a high percentage of silica and around 14% of alumina. By treating this residue with hydrochloric acid at an elevated temperature, then separating the solid material and washing it with water, a large portion of the remaining alumina will be removed and the structure of the silica so changed that the mass after being dried and pulverized is a very effective decolorizer and purifier for various oils and particularly for certain petroleum oils.

In practice each ton of the siliceous residue is treated with 200 pounds of 10° to 20° Bé. hydrochloric. This mass is agitated from 12 to 24 hours and during this time is heated to approximately the boiling point of the acid by external heat or by the introduction of steam into the mass.

After this operation the mass is washed with water until all the acid and water soluble reaction products are removed, and is then dried and pulverized to the desired fineness.

While the 10% of 10° to 20° Baumé acid has been found to be the desired limits to bring about the desired result in a reasonable time we have found that as little as 6% of 18° Baumé hydrochloric may be used and a product obtained which will decolorize oils.

After the above treatment only about 8% of alumina remains, and when properly washed the product is practically neutral in reaction.

It has been found that sulphuric acid cannot be substituted for the hydrochloric and the same results obtained. This however would be expected since in the initial treatment of the clay sulphuric acid was used.

While the products may be used as a filter for oil in the percolation process, it has been found with this product as with others that best results are obtained when the contact method is used since a more intimate mixing of the color absorbing material in the oil is effected.

Having thus described my invention, what I claim is:

1. The herein described process of producing a decolorizing agent for oils which consists in first baking clay and then treating the same with sulphuric acid for the purpose of extracting aluminum, washing the resultant solid material and treating such resultant material with hydrochloric acid, washing the solid material with water, and drying the same.

2. The herein described process of producing a decolorizing agent for oils from clay which consists in baking the clay, then extracting with sulphuric acid until the alumina content is of the order of 14%, treating the residue with approximately 10% of 10° to 20° Baumé hydrochloric acid until the alumina content is reduced to the order of 8%, and washing and drying the residue.

In testimony whereof, I hereunto affix my signature.

EDWARD E. ROLL.